Dec. 26, 1967  R. S. WOOLDRIDGE  3,360,685
PROTECTIVE CIRCUIT USING SILICON CONTROLLED RECTIFIER
Filed June 3, 1965

INVENTOR
ROBERT S. WOOLDRIDGE

BY *Edward M. Farrell*

ATTORNEY

United States Patent Office 3,360,685
Patented Dec. 26, 1967

3,360,685
PROTECTIVE CIRCUIT USING SILICON CONTROLLED RECTIFIER
Robert S. Wooldridge, Norristown, Pa., assignor to Sperry Rand Corporation, New York, N.Y., a corporation of Delaware
Filed June 3, 1965, Ser. No. 460,973
8 Claims. (Cl. 317—16)

ABSTRACT OF THE DISCLOSURE

A circuit is provided for preventing excessive current through a load. A normally non-conductive silicon controlled rectifier is connected across the load to which an input voltage is applied. Switching means is connected between the silicon controlled rectifier and the source of input voltage. A detector circuit detects a drop in the voltage level of the input voltage to actuate the switching means to drive the silicon controlled rectifier to a conducting state to thereby produce a short circuit across the load. This short circuit draws heavier current from the power supply almost instantly and causes the main circuit breakers to break more rapidly.

---

Figure 1:
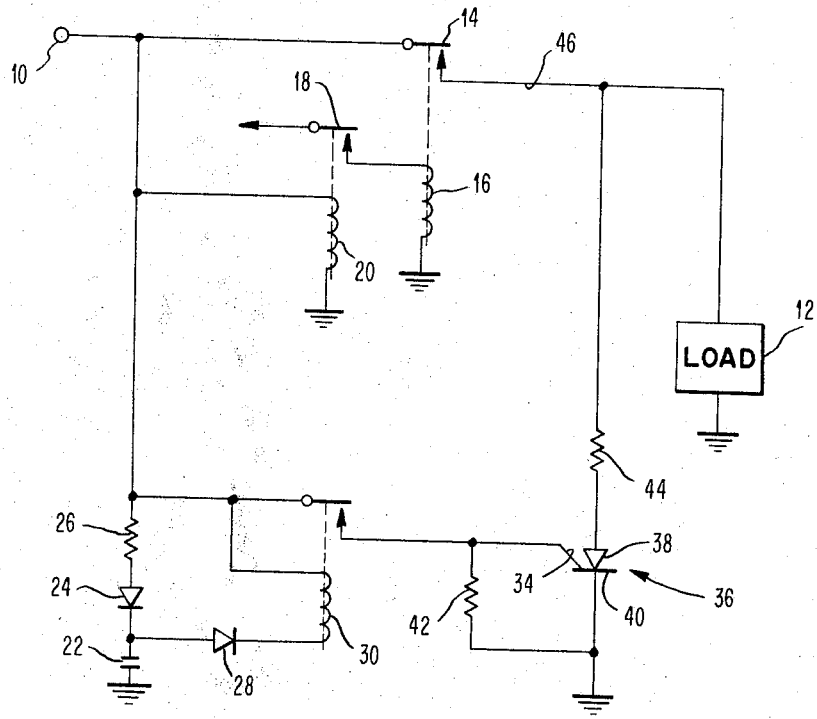

This invention relates to protective circuits, and more particularly to circuits for preventing excessive current from flowing through a load circuit.

In many cases, where power is applied to a load and a short circuit or other defective operating condition suddenly occurs to cause excessive current through the load, it is important that the power be disconnected almost instantaneously. Otherwise, valuable and critical parts are subjected to being burned out necessitating expensive and time consuming repairs.

Various different types of circuits and devices have been employed in the past to disconnect the power from loads under defective operating conditions. For example, fuses and mechanical relays have been used extensively. While these devices have been in the main satisfactory, a finite amount of time must generally elapse before they become effective to disconnect the power from the load. This short time, however slight, is often intolerable in many systems because critical and expensive elements and components may be of the type that they become burned out if subjected to excessive current even for a short time.

Other protective circuits involving electronic components, such as fast acting transistors, have also been used to disconnect the source of power from a load in the event of overload. In the main, such circuits have been relatively complex and designed to accommodate only particular types of circuits.

In many power supplies, when excessive current starts to flow through a load, the source of voltage producing the current drops slightly. Consequently, it is apparent that a protective circuit may be responsive to either excessive current through the load or to a drop in the level of the input voltage.

A circuit which has come into wide use in cases requiring a high degree of regulation is the so-called ferroresonant power supply. This type of circuit includes input and output winding associated with a magnetic structure. An additional winding connected to a capacitor may also be associated with the magnetic structure. The ferroresonant power supply has a high regulating characteristic with the output voltage very insensitive to either large static or dynamic changes in the input voltage. Another characteristic of such a power supply is that it will give a limited short circuit current with a large drop in the output voltage. In other words, while a high degree of regulation is available over a wide range, if the operating condition falls out of that range as a result of a short circuit, the voltage will drop sharply. The output current, however, will be limited, for example, to twice its normal current. While the subject invention is not directly related to ferroresonant power supply circuits, it has found particular application with such circuits.

It is an object of this invention to provide an improved protective circuit for preventing excessive current from flowing through a load.

It is a further object of this invention to provide an improved protective circuit which has a very fast response time.

It is still a further object of this invention to provide a protective circuit to prevent excessive current from flowing in a load without placing any additional resistance or inductance in the power line.

It is still a further object of this invention to provide an improved protective circuit for use with a ferroresonant power supply.

In accordance with the present invention, a circuit for preventing excessive current through a load circuit is provided. A normally non-conducting silicon controlled rectifier is connected across the load circuit to which an input voltage is applied. Switching means is connected between the silicon controlled rectifier and the source of input voltage. A detector circuit detects a drop in the level of the input voltage to actuate the switching means to drive the silicon controlled rectifier to a conducting state to thereby produce a short circuit across the load.

Figure 2:
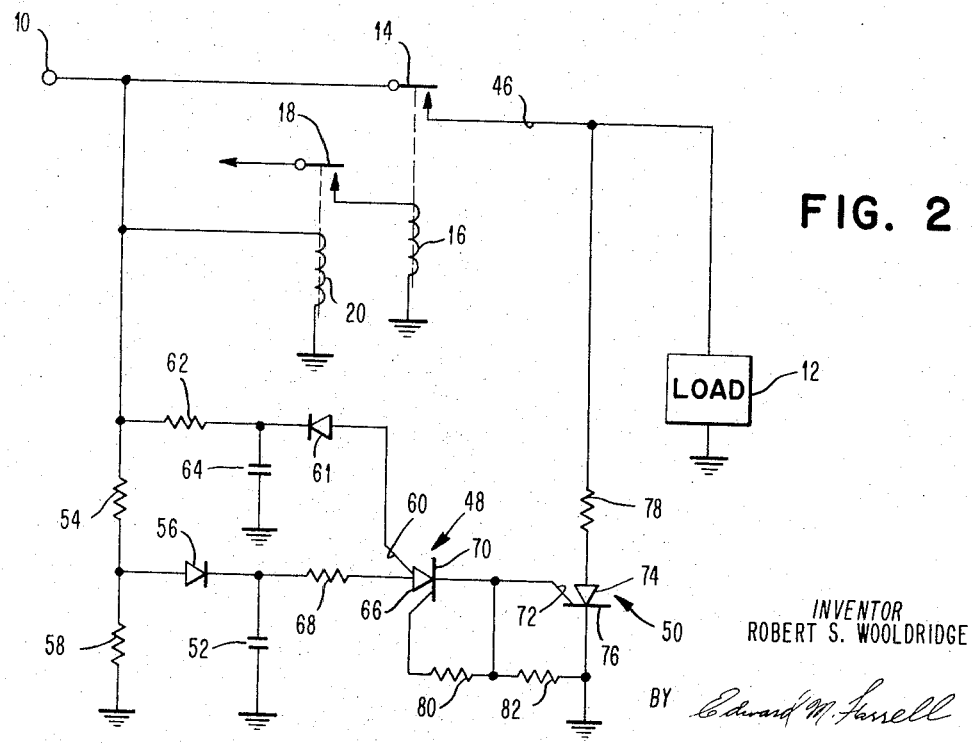

Other objects and advantages of the present invention will be apparent and suggest themselves to those skilled in the art, from a reading of the following specification and claims, in conjunction with the accompanying drawing, in which:

FIGURE 1 is a schematic diagram of a protective circuit, in accordance with the present invention, and FIGURE 2 is a schematic diagram of another embodiment of a protective circuit, in accordance with the present invention.

Referring particularly to FIGURE 1, a source of input direct current voltage is applied to an input terminal 10 across a load circuit 12 through a switch 14. The output circuit of a ferroresonant power supply may be connected to the terminal 10. When current is to flow through the load 12 during normal operation, the switch 14 is held closed by current through a coil 16. The coil 16 may be connected to various interlock control circuits in other portions of a system through a switch 18. The switch 18 is maintained in a closed position by current through a coil 20 of a relay. During normal operation, current flows from the input terminal 10, through the closed contacts of the switch 14, and through the load 12. The various switches included thus far have been illustrated since they are found in most large systems where interlock circuits and the like are involved. If the load circuit 12 suddenly starts to draw excessive current, the voltage at the input terminal 10 will drop. When the voltage at the input terminal 10 drops, the current through the winding 20 decreases causing the switch 18 to open. Upon opening of the switch 18, no current will flow in the coil 16 and the switch 14 will also open. The arrangement thus far described is similar to that found in many conventional systems, such as computer systems which a large number of different types of complex circuits are involved. However, it takes a relatively long time for the various switching and relay elements involved to become actuated to cause the source of power to be disconnected from the load circuit. As mentioned, in many cases, the load circuit 12 may include various critical elements which will burn out if excessive current is applied thereto even for a relatively short time.

The rest of the circuit of FIGURE 1, to be described, relates to the present invention. Its purpose is to assure that, when an excessive current occurs through the load, it is redirected to another path to prevent damage to the elements within the load circuit.

A capacitor 22 is charged to the voltage level of input terminal 10 through a coupling diode 24 and a resistor 26. When the capacitor 22 is charged to the same potential as the input terminal 10, no current flows through a diode 28 or a coil 30 of a low voltage sensitive relay. With no current through the coil 30, the contacts of the switch 32 remains open.

The switch 32 is connected to a gate electrode 34 of a silicon controlled rectifier 36. The silicon controlled rectifier 36 is normally non-conducting with no current flowing between its anode 38 and its cathode 40. Resistor 42 is connected between the gate electrode 34 and the anode 40 to provide proper biasing potential for the silicon controlled rectifier 36. A resistor 44 of a very low resistance is connected between the line 46 and the anode 38. The resistor 44 and the silicon controlled rectifier 36 are connected directly across the load circuit 12.

The operation of a silicon controlled rectifier is well known to those skilled in the field. In general, such a silicon controlled rectifier may operate similar to a diode and may be normally non-conducting with no current flowing between its anode and cathode. However, upon the application of a suitable signal to its gating electrode, the silicon controlled rectifier may be driven to a conducting state. The silicon controlled rectifier will continue to conduct even after the termination of the signal to the gating electrode. A silicon controlled rectifier has an extremely low impedance path between its anode and cathode when it is in a conducting state.

When excessive current starts to flow through the load circuit 12, the voltage at the input terminal 10 drops. When this happens, the capacitor 22 will discharge through the diode 28 and the coil 30. Current through the coil 30 causes the switch 32 to close. Upon closing of the switch 32, voltage is applied from the input terminal 10 to the gate electrode 34 to drive the silicon controlled rectifier 36 to a conducting state. The conduction of the silicon controlled rectifier 36 operates as a substantial short circuit across the load 12 to prevent excessive current form flowing through the load 12. This action is extremely fast and is capable of taking place before various mechanical elements, found in many conventional protective circuits, can be made to operate.

It is noted that the protective circuit provided by the present invention provides a short circuit relatively fast to draw heavier current from the power supply almost instantly. Thus while a normal defect or short circuit would tend to take a finite time to cause the main circuit breakers to become active, the present invention speeds up this process by creating a greater short circuit condition.

After the load 12 has been protected from excessive current flowing therethrough by the circuit just described, the main protective circuits within the system will start to operate. A drop in the voltage at the input terminal 10 causes the current through the coil 20 to decrease and the switch 18 to open. When the switch 18 opens, no current flows through the coil 16 to cause the switch 14 to open. Opening of the switch 14 disconnects the source of power from the load circuit 12.

Referring particularly to FIGURE 2, the circuitry involving the main protective circuits used heretofore is substantially the same as that described in connection with FIGURE 1. For example, the operation of switches 14 and 18, and the coils 16 and 20 with respect to the voltage from the input terminal 10 applied across the load 12 is substantially the same and hence will not be redescribed. However, the portion of the protective circuit to instantly disconnect or redirect excessive current from flowing through the load 12 is slightly different.

A silicon controlled rectifier 48 is used to sense the drop in output voltage at the terminal 10. Operation of the silicon controlled rectifier 48 will in turn cause operation of the silicon controlled rectifier 50, as will be seen. A capacitor 52 is charged by the voltage from the terminal 10 through a resistor 54 and a coupling diode 56. An additional resistor 58 is provided, with the combination determining the desired tripping level of the input voltage.

The gating electrode 60 of the silicon controlled rectifier 48 is connected to the input terminal 10 through a filter network comprising a resistor 62 and a capacitor 64. The capacitor 52 is connected to the anode 66 of the silicon controlled rectifier 48 through a resistor 68. The silicon controlled rectifier switch 48 may be a four layer solid state device which will tigger when the anode gate 60 is more negative than the anode 66. When the output voltage to the terminal 10 drops below the desired tripping level, the silicon controlled rectifier 48 will be fired with the capacitor 52 discharging through the anode 66, cathode 70 and the silicon controlled rectifier 50. The diode 61 prevents reverse flow of current in the anode gate circuit of the silicon controlled rectifier 48.

When the capacitor 52 discharges and a signal is applied to the gate electrode 72 of the silicon controlled rectifier 50, current flows from the line 46 through the anode 74 and the cathode 76 of the silicon controlled rectifier 50. The silicon controlled rectifier 50, along with a resistor 78 of low resistance, provide a low impedance path across the load 12 to prevent excessive current from flowing therethrough, as previously described.

A resistor 80 provides the proper operating potential for the silicon controlled rectifier 48, and a resistor 82 provides the proper operating potential for the silicon controlled rectifier 50.

There has thus been described a relatively simple circuit wherein a silicon controlled rectifier is triggered in response to the drop in the input voltage level to produce a short circuit across a load. The drop in input voltage, being generally indicative of excess current to the load, causes an extremely fast response when the drop is detected by the silicon controlled rectifier circuit. The present invention finds particular application with ferroresonant power supply circuits which are subject to large voltage drops under excessive current or short circuit conditions.

The embodiments of the invention in which an exclusive property or privilege is claimed are defined as follows:

1. A circuit for preventing excessive current through a load circuit comprising a non-conducting silicon controlled rectifier connected across said load circuit, said silicon controlled rectifier including a gating electrode for switching said rectifier to a conducting state upon the application of a signal thereto, a source of input voltage to be applied to said load, a storage circuit for storing voltage of substantially the same amplitude as said input voltage, normally open, switching contacts connected between said silicon controlled rectifier and said source of voltage, a voltage sensitive relay for closing said switching contacts when current flows through said relay, said relay being connected between said storage circuit and said source of input voltage, whereby current flows through said relay when the amplitude of said input voltage drops below the amplitude of the voltage at said storage means to cause a signal from said source of voltage to be applied to the gating electrode of said silicon controlled rectifier, said silicon controlled rectifier being driven to a conducting state to produce a relatively low impedance path across said load, and additional means for detecting a drop in the voltage of said input voltage to disconnect said source of voltage from said load circuit.

2. The invention as set forth in claim 1 wherein said storage circuit comprises a capacitor, and a bi-directional device is connected between said source of input voltage and said storage circuit.

3. The invention as set forth in claim 2 wherein said source of input voltage comprises a ferroresonant direct current power supply.

4. The invention as set forth in claim 3 wherein a bi-directional device is interposed between said storage circuit and said relay.

5. A circuit for preventing excessive current through a load circuit comprising a non-conducting first silicon controlled rectifier connected across said load circuit, said silicon controlled rectifier including a gating electrode for switching said rectifier to a conducting state upon the application of a signal thereto, a source of input voltage to be applied to said load, switching means including a second silicon controlled rectifier having a gating electrode connected between said first silicon controlled rectifier and said source of voltage, a detector circuit associated with said second silicon controlled rectifier for detecting a drop in the level of said input voltage, said detector circuit being responsive to a drop in voltage at said source of voltage to cause said second silicon controlled rectifier to become conducting to permit a signal from said source of voltage to be applied to the gating electrode of said first silicon controlled rectifier to drive it to a conducting state to produce a relatively low impedance path across said load, and additional means for detecting a drop in the voltage of said input voltage to disconnect said source of voltage from said load circuit.

6. The invention as set forth in claim 5 wherein said detector circuit includes a storage circuit connected to be charged by the voltage from said input voltage source through a diode device.

7. The invention as set forth in claim 6 wherein a second diode and filter network is connected between the gating electrode of said second silicon controlled rectifier and said source of input voltage.

8. The invention as set forth in claim 7 wherein said source of input voltage comprises a ferroresonant direct current power supply.

References Cited
UNITED STATES PATENTS

| | | | |
|---|---|---|---|
| 2,571,027 | 10/1951 | Garner | 317—16 X |
| 2,840,766 | 6/1958 | Wouk | 317—16 |
| 3,105,920 | 10/1963 | Dewey | 317—31 X |
| 3,215,896 | 11/1965 | Stattuck et al. | 317—16 |
| 3,253,189 | 11/1966 | Wouk | 317—16 |
| 3,243,796 | 3/1966 | Harmon et al. | 317—31 |
| 3,281,638 | 10/1966 | Crawford. | |

MILTON O. HIRSHFIELD, *Primary Examiner.*

R. V. LUPO, *Assistant Examiner.*